March 31, 1970     C. A. MIONE     3,503,475
VENTED DISC BRAKE FRICTION PAD AND DISC BRAKE
SYSTEM EMPLOYING SAME
Filed March 6, 1968
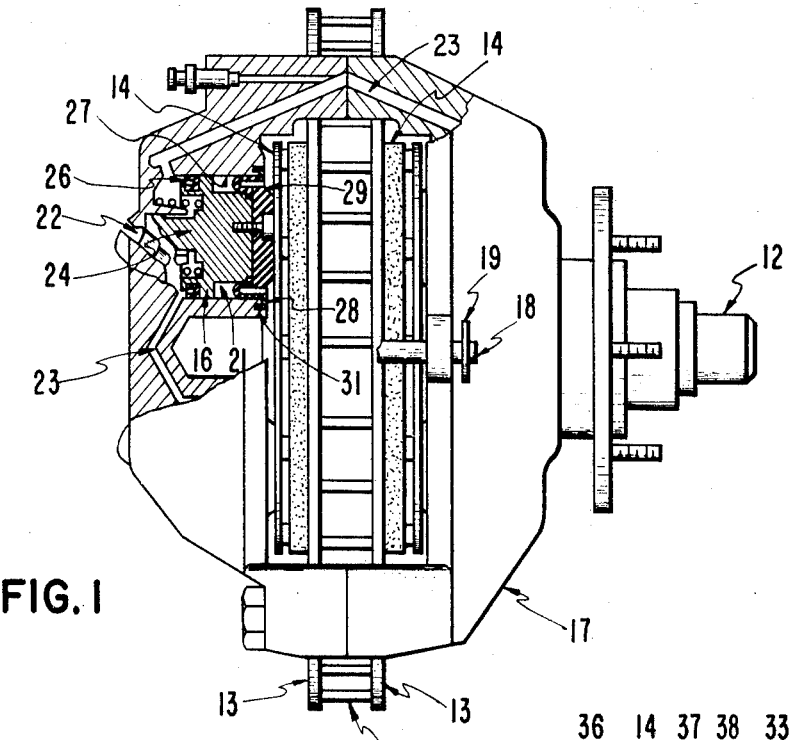
FIG. 1
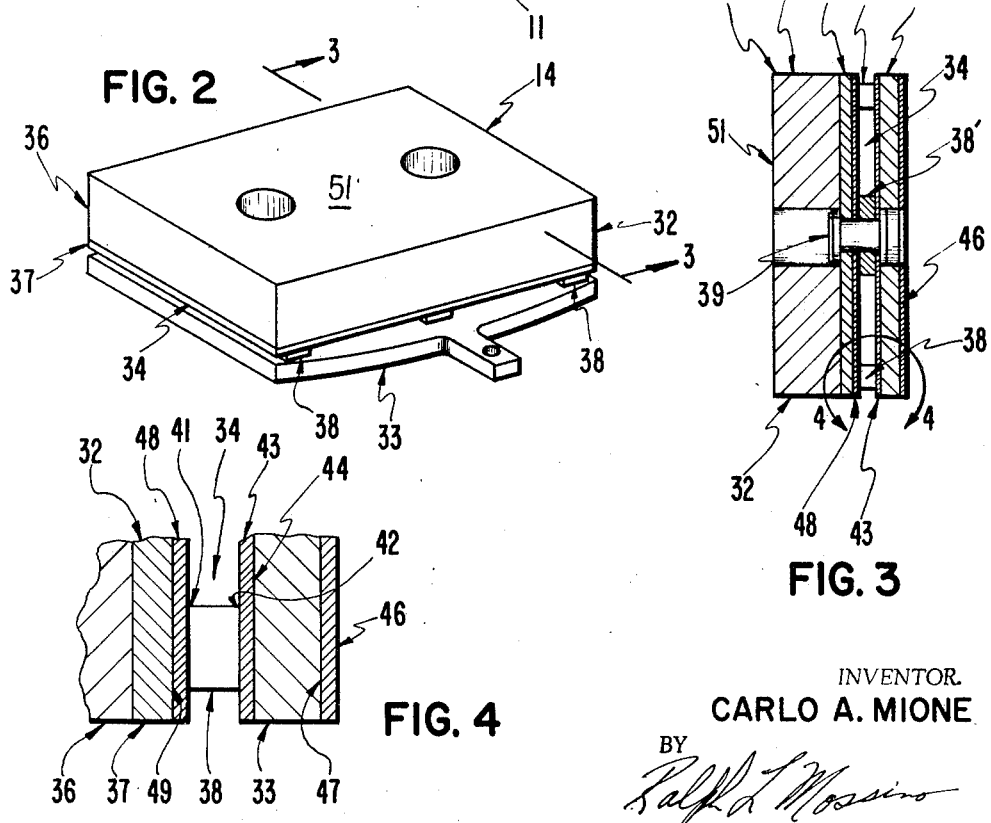
FIG. 2
FIG. 3
FIG. 4
INVENTOR.
CARLO A. MIONE
BY

United States Patent Office

3,503,475
Patented Mar. 31, 1970

3,503,475
VENTED DISC BRAKE FRICTION PAD AND DISC BRAKE SYSTEM EMPLOYING SAME
Carlo A. Mione, 14599 Acapulco Road,
San Leandro, Calif. 95177
Filed Mar. 6, 1968, Ser. No. 710,843
The portion of the term of the patent subsequent to
Sept. 10, 1985, has been disclaimed
Int. Cl. F16d 65/04, 65/12
U.S. Cl. 188—250                                    11 Claims

ABSTRACT OF THE DISCLOSURE

A disc brake spot-type friction pad assembly includes a lining of friction material on a backing plate supported spaced from a base plate to define a vented air space between the backing and base plates. Thermally reflective material is coated on the surface of the base plate facing the backing plate.

BACKGROUND OF INVENTION

The present invention is a disc brake friction pad assembly and disc brake system employing same of the type described in my copending application, Ser. No. 562,292 for "Disc Brake Friction Pad and Disc Brake System" filed on July 1, 1966, now Patent No. 3,400,789. In my application, I have shown that brake fading and fluid boiling problems often encountered during severe braking conditions could be avoided by providing a vented air space between the backing plate of the friction lining material and a supporting base plate of a disc brake friction pad assembly. Unfortunately, however, when the backing plate is made of mild steel, it is found that in some instances the backing plate deforms, particularly, at locations close to the structure supporting the backing plate and friction lining spaced from the base plate. This deforming tends to reduce the air space gap between the backing and base plates, thereby, reducing the effectivenes of the vented air space of preventing undesirable heat transfer to the base plate, hence, hydraulic brake fluid. By allowing more heat flow to the hydraulic brake fluid, the disc brake system is more susceptible to fluid boiling problems. Furthermore, excessive deforming can lead to structural failure which can be very dangerous.

It is believed that the deforming is caused at least in part by the localized pressures created during braking operations at the contact points between the support structure and plates. By increasing the total area of the base and backing plates which contact the support structure, the pressure can be reduced at the contact points. However, increasing the total area of contact between the support structure and plates increases the total heat conducted to the base plate, hence, rendering the disc brake system more susceptible to fluid boiling problems.

Because of the vented air space in my disc brake friction pad assembly subject of my above-identified application, it is possible to use sintered metallic friction lining materials in disc brake systems without fear of boiling the hydraulic brake fluid. In testing various metallic friction lining materials, it was found that some perform superiorly at higher temperatures than at lower temperatures. Such materials commonly are referred to as "high energy" materials and are most suitable for use in racing cars. Hence, when employing high energy metallic friction lining materials, it is desirous to limit the heat flow away from the friction lining material.

Considerable advantage is therefore to be gained by the provision of a disc brake system and a disc brake friction pad assembly having a vented air space employed in same which are less susceptible to structural weakness at high operating temperatures. Other advantages will be realized where a disc brake friction pad assembly having a vented air space is provided which limits the heat flow from the friction lining material thereby enhancing the operating efficiency of high energy metallic friction lining materials.

SUMMARY OF INVENTION

The present invention relates generally to a disc brake friction pad assembly having a vented air space between the friction lining material and its supporting base plate and a disc brake system employing same. More specifically, it relates to such a disc brake friction pad assembly and disc brake system employing same which perform well at high operating temperature conditions.

In accordance with the present invention, a pad comprising friction material is supported spaced from a base plate to define a vented air space therebetween through which air is able to pass. It was discovered that when the pad included a mild steel backing plate, deforming could be prevented under even the severest of braking operations by disposing thermally reflective material adjacent to the surface of the base plate facing the pad. By preventing deforming of the mild steel backing plate, the air space gap between the pad and base plate is maintained. Maintaining the desired air space gap prevents undesirable fluid boiling heat transfer to the hydraulic brake fluid.

The thermally reflective material also reduces the heat flow to the hydraulic brake fluid by reflecting incident heat radiated from the pad. A reduction of heat flow to the hydraulic fluid can be accomplished by locating the thermally reflective material adjacent either of the opposing pad and base plate surfaces or the surface of the base plate facing away from the pad.

The reduction in heat flow provided by the thermally reflective material makes it possible to increase the total area of contact between the pad, base plate and support structure over that of the assemblies not having the thermally reflective material while maintaining the heat flow to the hydraulic fluid below that which causes boiling. As explained hereinbefore, increasing the contact area reduces the localized pressures created during braking operations, thereby, further aiding in preventing the deforming of the backing plate of the pad.

The thermally reflective material also tends to reduce the heat flow from the braking face of the friction pad assembly. This is particularly advantageous when using high energy metallic friction line materials. Although any location of the thermally reflective material in the heat flow path has some effect on the reduction of heat flow from the braking face, best results are obtained by locating it adjacent to the surface of the pad facing the base plate of the assembly.

BRIEF DESCRIPTION OF DRAWING

The foregoing and other advantages and features of the present invention will become apparent from the following description and claims considered together with the accompanying drawing of which:

FIG. 1 is a top view of a caliper-type disc brake system in accordance with the present invention with broken away portions.

FIG. 2 is a perspective view of one embodiment of the disc brake friction pad assembly of the present invention.

FIG. 3 is a cross sectional view of the friction pad assembly taken along line 3—3 of FIG. 2.

FIG. 4 is a fragmentary sectional view of the friction pad assembly delineated by line 4—4 of FIG. 3.

DESCRIPTION OF PREFERRED EMBODIMENT

With reference to FIG. 1, disc brake systems, such as caliper types, include a rotatable brake disc 11 secured to rotate with, for example, a wheel hub 12 of a vehicle. Generally, each side of the brake disc 11 defines a braking surface 13 with the braking surfaces 13 being parallel. Braking is accomplished by means of a friction pad assembly 14 mounted opposite each braking surface 13 of the brake disc 11 to engage the braking surface when urged by an actuator means such as hydraulically actuated piston assemblies 16.

In the illustrated embodiment, a caliper housing 17 is attached to the steering knuckle (not shown) of the vehicle to straddle an arcuate portion of the brake disc 11 at a station along its path of rotation. The friction pad assemblies 14 are supported within the housing 17, one opposing each brake surface 13. The assemblies 14 are prevented from being ejected from the housing 17 by a retaining means such as pin 18 and clips 19. To urge the friction pad assemblies 14 into frictional engagement with the opposing braking surfaces 13, four hydraulically actuated piston assemblies 16 are provided, two for urging each of the friction pad assemblies 14. Each piston assembly 16 is carried and guided by a cylinder bore 21. Hydraulic fluid introduced from the master brake cylinder system (not shown) at inlet 22 is delivered to the cylinder bores 21 by interconnected internal fluid passageways 23.

Each piston assembly 16 comprises a piston 24 slideably disposed within the cylinder bore 21. An O-ring seal 26 is secured circumferentially about the piston 24 to press against the walls 27 of the bore 21 in a liquid tight slideable relation. The O-ring seal 26 prevents the hydraulic fluid from escaping the hydraulic system. A flexible boot 28, usually of rubber, is secured circumjacent the forwarded end of the piston 24 by a cap 29. The boot 28 is fastened at the lip of the cylinder bore 21 by wedging the outer edge of the boot 28 into a channel 31 provided circumjacent the bore opening. The boot 28 serves to retract the piston 24 after the braking operation is terminated and to prevent foreign matter from entering the cylinder bore 21.

One embodiment of the friction pad assembly 14 particularly suited for use in the caliper-type disc brake system of FIG. 1 is shown in FIGS. 2–4. As illustrated therein, in accordance with the present invention, the friction pad assembly 14 has a friction pad 32 supported spaced from a base plate 33 to define an air space 34 vented to the assembly's surroundings to allow air to pass therethrough. The friction pad 32 includes a lining 36 of suitable friction material, e.g., sintered metallic, bonded as by sintering to a backing plate 37. The friction pad 32 is supported spaced from the base plate 33 by, for example, pedestals 38 secured as by welding to the base plate 33 and rivets 39, preferably, passing only through inwardly positioned pedestals 38'. Instead of using rivets in constructing the friction pad assembly 14, the pedestals 38 and 38' could be welded to both the base plate 33 and backing plate 37. Although welding all of the pedestals 38 and 38' to the backing plate 37 tends to increase the heat conducted to the base plate 33, as will become more apparent from the description hereinbelow, the use of thermally reflective material in accordance with the present invention maintains the heat flow to the hydraulic braking fluid below that which causes fluid boiling. The manner of constructing the friction pad assembly 14 is described in detail in my above-identified application.

As described in my above-identified application, the provision of the vented air space 34 enables the disc brake system to operate free of braking fading and fluid boiling. However, when the backing plate 37 is constructed from mild steel, it has been found that prolonged or often repeated braking operations occasionally result in deforming the backing plate 37 at locations close to the contact points 41 and 42 of the pedestals 38 with the backing and base plates 37 and 33. As explained hereinbefore, this deforming is objectionable because the air space 34 gap is reduced and the friction pad assembly 14 is structurally weakened.

By using materials, such as stainless steel, which retain their strength at high temperatures, such deforming problems can be avoided. However, many advantages are gained by using mild steel instead of such other materials as stainless steel. Most importantly, mild steel is inexpensive, is easier to machine and is commonly used by the materials manufacturers that supply the friction pads 32.

Referring now to FIGS. 3 and 4, it is found that the deforming problems can be eliminated by disposing a thermally reflective material layer 43 on the surface 44 of the base plate 33 facing the backing plate 37 of the friction pad 32. The layer 43 of thermally reflective material can be joined intimately to the base plate 33 as by coating, or it can form a sheet member supported adjacent to the surface 44 of the base plate 33. For ease of manufacturing, it is preferred to form the layer 43 of thermally reflective material by coating the material onto the surface 44 of the base plate 33. Thermally reflective materials of zinc, chromium and gold have been used to prevent the deforming of the backing plate 37. In the friction pad assembly embodiments using zinc to form the thermally reflective layer 43, zinc was coated onto the base plate surface 44 by the common hot dip process. In those embodiments employing chromium to form the thermally reflective layer 43, chromium was coated onto the base plate surface 44 by the common hot chromium plating process. When gold was employed to form the thermally reflective layer 43, gold was coated onto the base plate surface 44 by the common hot gold plating process. Other materials, both metallic and non-metallic, which retain thermally reflective characteristics at elevated temperatures can be used to form the thermally reflective layer 43. Furthermore, other processes could be used to form the coated thermally reflective layer 43. However, the foregoing processes of forming the layers of zinc, chromium and gold are preferred because they are relatively inexpensive and the layers adequately retain their thermally reflective characteristics at the high temperatures encountered in use.

As explained hereinbefore, the layer 43 of thermally reflective material reduces the heat flow from the friction pad 32 to the base plate 33, hence, hydraulic brake fluid. The heat flow to the hydraulic brake fluid also can be reduced by disposing a layer 46 of thermally reflective material, such as chromium, on the surface 47 of base plate 33 facing away from the air space 34 and which is engaged by the actuator or piston 24 of the hydraulic actuating system (see FIG. 1). A layer 48 of thermally reflective material, such as chromium, disposed on the surface 49 of the backing plate 37 facing the base plate 33 also serves to reduce the heat flow to the hydraulic brake fluid. Reducing the heat flow to the hydraulic brake fluid aids in preventing fluid boiling problems. Furthermore, use of thermally reflective material to reduce the heat flow to the hydraulic brake fluid makes it possible to increase the area of contact between the support structure or pedestals 38 and 38', the friction pad 32 and the base plate 33 over that of assemblies 14 not having the thermally reflective material without boiling the hydraulic brake fluid. Increasing the contact area results in a reduction in the pressures created during braking operations at the contact locations 41 and 42. This reduction in pressure tends to reduce the tendency of the backing plate 37 to deform.

Disposing thermally reflective material adjacent to the surface 49 of the friction pad 32 has an important advantage in addition to the aforementioned advantages. When using high energy metallic friction lining material, such as an iron based sintered metallic material including principally 68.55% Fe, 17.97% C, 7.45% $Al_2O_3$, 1.24% TiO, 1.09% SiO and 0.91% $SiO_2$ manufactured by Raybestos-Manhattan under the material number W–5167 C, it is desired to maintain the lining 36 at high operating temperatures. Disposing a layer 48 of thermally reflective material adjacent to the friction pad surface 49 reflects a substantial portion of the incident heat from the surface 51 of the lining 36 back into the lining. This limits the heat flow away from the friction pad 32, hence, maintains the lining at a higher operating temperature than would exist in the absence of the thermally reflective layer 48.

While the present invention has been described with respect to a specific emobdiment, it will be apparent that numerous modifications and variations are possible within the scope of the invention.

What I claim is:

1. A disc brake system comprising a rotatable member adapted to be coupled to a driven member and having a braking face, a friction pad assembly mounted for engagement with the rotatable member, said friction pad assembly comprising a base plate having opposite surfaces, a friction pad including a lining of friction material defining a surface for engaging the braking face of said rotatable member and a surface opposite that engaging said rotatable member facing one of said opposite base plate surfaces, said friction pad supported spaced from said base plate to define a space therebetween vented to the assembly's surroundings through which air can flow, and thermally reflective material disposed adjacent at least one of the opposite base plate and facing friction pad surfaces; and means engaging the base plate for urging said friction pad assembly into engagement with said rotatable member.

2. In a friction pad assembly for use in a disc brake system comprising a base plate having opposite surfaces, and a friction pad having a surface facing one of the opposite base plate surfaces and including a lining of friction material supported spaced from said base plate to define a space therebetween vented to the assembly's surrounding through which air can flow, the improvement comprising thermally reflective material disposed adjacent at least one of the opposite base plate and facing friction pad surfaces.

3. The apparatus according to claim 2 wherein said friction pad includes a lining of high energy metallic friction material, and thermally reflective material is disposed adjacent the friction pad surface facing the base plate.

4. The apparatus according to claim 2 wherein said friction pad includes a lining of friction material bonded to a backing plate, said backing plate defining the surface of the friction pad facing the base plate, and said thermally reflective material is disposed adjacent the surface of said base plate facing the backing plate of said friction pad.

5. The apparatus according to claim 2 wherein thermally reflective material is disposed adjacent the base plate surface facing the friction pad.

6. The apparatus according to claim 5 wherein thermally reflective material is disposed adjacent the base plate surface facing away from the friction pad.

7. The apparatus according to claim 6 wherein thermally reflective material is disposed adjacent the friction pad surface facing the base plate.

8. The apparatus according to claim 2 wherein thermally reflective material is coated on at least one of the surfaces.

9. The apparatus according to claim 8 wherein the coating of thermally reflective material is of zinc.

10. The apparatus according to claim 8 wherein the coating of thermally reflective material is of chromium.

11. The apparatus according to claim 8 wherein the coating of thermally reflective material is of gold.

References Cited

UNITED STATES PATENTS

| | | |
|---|---|---|
| 1,792,823 | 2/1931 | Day. |
| 2,238,943 | 4/1941 | McCune et al. |
| 3,400,789 | 9/1968 | Mione. |

MILTON BUCHLER, Primary Examiner

G. E. A. HALVOSA, Assistant Examiner

U.S. Cl. X.R.

188—261, 264